US008618908B2

(12) United States Patent
Shaffer et al.

(10) Patent No.: US 8,618,908 B2
(45) Date of Patent: Dec. 31, 2013

(54) PROVIDING AN ENDPOINT ACCESS TO A LOCKED TARGET

(75) Inventors: Shmuel Shaffer, Palo Alto, CA (US);
Ramanathan T. Jagadeesan, San Jose, CA (US); Bich T. Nguyen, Los Altos, CA (US); Gregory D. Pelton, Raleigh, NC (US); Labhesh Patel, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 999 days.

(21) Appl. No.: 11/943,060

(22) Filed: Nov. 20, 2007

(65) Prior Publication Data
US 2009/0128285 A1    May 21, 2009

(51) Int. Cl.
*B60R 25/00* (2013.01)

(52) U.S. Cl.
USPC ......... 340/5.7; 340/5.71; 340/5.72; 340/5.73; 340/5.74; 340/539.1; 340/426.13; 340/426.35; 340/426.36; 340/539.15

(58) Field of Classification Search
USPC ....................................................... 340/5.7
See application file for complete search history.

(56) References Cited

U.S. PATENT DOCUMENTS

| | | | |
|---|---|---|---|
| 4,672,375 A | 6/1987 | Mochida et al. ......... 340/825.31 |
| 5,428,795 A * | 6/1995 | Johnson et al. ............... 710/240 |
| 5,874,785 A | 2/1999 | Liu ............................... 307/10.5 |
| 5,909,183 A * | 6/1999 | Borgstahl et al. .......... 340/12.29 |
| 6,130,621 A * | 10/2000 | Weiss ............................ 340/5.28 |
| 6,219,421 B1 | 4/2001 | Backal |
| 6,232,874 B1 * | 5/2001 | Murphy ................... 340/426.19 |
| 6,400,255 B1 | 6/2002 | Ohnishi et al. ............... 340/5.62 |
| 6,505,780 B1 | 1/2003 | Yassin et al. |
| 6,526,335 B1 | 2/2003 | Treyz et al. |
| 7,242,282 B2 | 7/2007 | Pinckney, Sr. ........... 340/426.28 |
| 7,366,677 B1 * | 4/2008 | Liu et al. ........................... 705/5 |
| 7,400,712 B2 | 7/2008 | August ....................... 379/88.01 |
| 2001/0028295 A1 * | 10/2001 | Brinkmeyer et al. ........ 340/5.25 |
| 2002/0055817 A1 | 5/2002 | Chou ............................. 701/207 |
| 2002/0174077 A1 * | 11/2002 | Yui et al. ....................... 705/400 |
| 2003/0146820 A1 * | 8/2003 | Takamura et al. ............ 340/5.28 |
| 2003/0179075 A1 * | 9/2003 | Greenman .................... 340/5.54 |
| 2003/0189482 A1 * | 10/2003 | Arshad et al. ................ 340/5.61 |
| 2003/0236092 A1 | 12/2003 | Ebata et al. |
| 2004/0124968 A1 * | 7/2004 | Inada et al. ................... 340/5.72 |
| 2004/0252017 A1 * | 12/2004 | Holding et al. .............. 340/5.73 |
| 2005/0203752 A1 * | 9/2005 | Shinada ............................ 705/1 |
| 2007/0158128 A1 | 7/2007 | Gratz et al. |

OTHER PUBLICATIONS

Pending U.S. Appl. No. 11/934,843 entitled, "*Customizing a Target Using an Endpoint*", 20 pages specification, claims and abstract, 3 pages of drawings, inventors Shmuel Shaffer et al, Nov. 20, 2007.

(Continued)

*Primary Examiner* — Benjamin C Lee
*Assistant Examiner* — Curtis King
(74) *Attorney, Agent, or Firm* — Baker Botts L.L.P.

(57) ABSTRACT

In one embodiment, providing an endpoint access to a locked target includes receiving a virtual key at a grantee endpoint through a wireless link. The virtual key results from a permission from a grantor endpoint, and is operable to unlock a physical lock of the target. The virtual key is wirelessly transmitted to a management system of the target to unlock the lock.

17 Claims, 3 Drawing Sheets

(56) References Cited

OTHER PUBLICATIONS

Car/Key Memory, BMW 6 Series Coupé, BMW AG: 6 Series Coupé: All the facts: Interior equipment, 1 page, http://www.bmw.com/com/en/newvehicles/6series/coupe/2004/allfacts/equipment_interior.html, 2004.
Personal favourites, BMW Importer Libya, 1 page, http://www.bmw.ly/products_detail.cfm?objectid=55317FA8-40CA-72B8-685CFB88853, Printed Oct. 10, 2007.
BMW 325 Ci Convertible, BMW 325 Ci Convertible information, specifications, history, and images, Concept Carz From Concept to Production, 5 pages, © 1998-2007, http://www.conceptcarz.com/vehicle/z10687/default.aspx, Printed Oct. 10, 2007.
Mechanical Locks, infoplease, http://print.infoplease.com/ce6/sci/A0920693.html, 1 page, Printed Nov. 13, 2007.
Shaffer et al., *USPTO, Office Action* for U.S. Appl. No. 11/934,843, filed Nov. 5, 2007, mailed Jan. 21, 2010.
Shaffer et al., *USPTO, Final Office Action* for U.S. Appl. No. 11/934,843, filed Nov. 5, 2007, mailed Jul. 8, 2010.
Shaffer et al., *USPTO, Office Action* for U.S. Appl. No. 11/934,843, filed Nov. 5, 2007, mailed Nov. 10, 2010.
Mechanical Locks, infoplease, http://print.infoplease.com/ce6/sci/A0920693.html, Mar. 7, 2008.
*USPTO; Office Action* for U.S. Appl. No. 11/934,843 in the name of Shmuel Shaffer; 29 pages, Apr. 14, 2011.
RCE and RCE Response for U.S. Appl. No. 11/934,843, filed Jul. 14, 2011; 12 pages.
*USPTO; Office Action* for U.S. Appl. No. 11/934,843 in the name of Shmuel Shaffer; 31 pages, Aug. 15, 2011.
Response to *Office Action* for U.S. Appl. No. 11/934,843, filed Nov. 15, 2011 13 pages.
*USPTO; Office Action* for U.S. Appl. No. 11/934,843 in the name of Shmuel Shaffer; 39 pages, Jan. 27, 2012.

\* cited by examiner

PROVIDING AN ENDPOINT ACCESS TO A LOCKED TARGET

TECHNICAL FIELD

The present disclosure relates generally to communication networks.

BACKGROUND

Certain objects, such as automobiles, may have features that allow a user to access and customize the object. For example, a user may use an electronic key to automatically unlock the doors of an automobile. The user may also adjust the seats, steering wheel, and stereo receiver of the automobile. In certain automobiles, the automobile may record specific settings for specific drivers.

DESCRIPTION OF EXAMPLE EMBODIMENTS

Overview

In one embodiment, providing an endpoint access to a locked target includes receiving a virtual key at a grantee endpoint through a wireless link. The virtual key results from a permission from a grantor endpoint, and is operable to unlock a physical lock of the target. The virtual key is wirelessly transmitted to a management system of the target to unlock the lock.

Description

Figure 1:
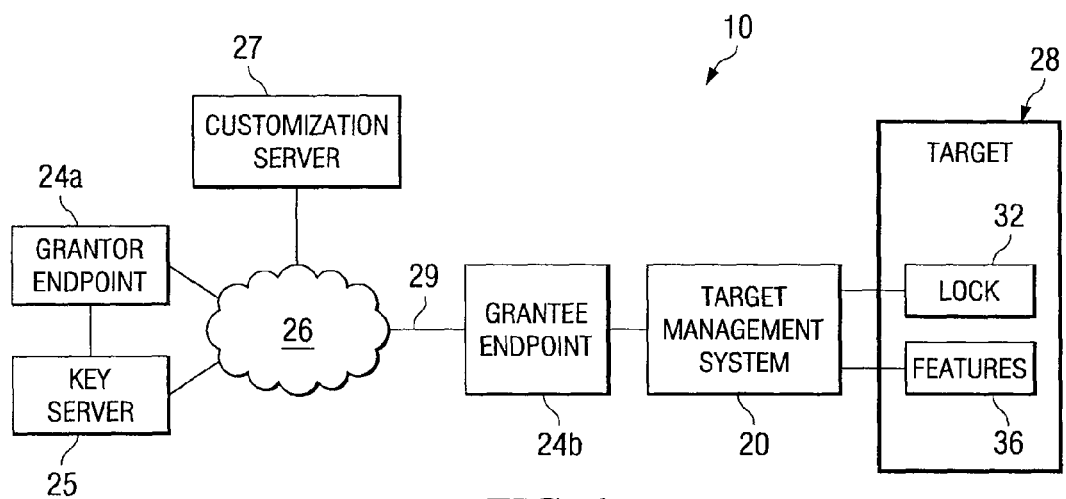
FIG. 1 illustrates an example system for accessing and customizing a target using an endpoint.

FIG. 1 illustrates one embodiment of a system 10 that includes a target 28, such as an automobile, that may be accessed and/or customized. System 10 includes endpoints 24, a key server 25, a communication network 26, a target management system 20, and a target 28 coupled as shown. Target 28 has a lock 32 and features 36.

In the embodiment, a grantor endpoint 24a grants a grantee endpoint 24b permission to access target 28. The permission allows grantee endpoint 24b to obtain a virtual key. The virtual key may include or point to attributes that designate when, where, and/or how target 28 may be used. Grantee endpoint 24b transmits the key to target 28 to unlock lock 32 of target 28. If a restriction given by an attribute is breached, a designated endpoint 24, such as grantor endpoint 24a, is notified of the breach. The permission may be modified in response to the notification to restrict or revoke use of target 28.

According to the illustrated embodiment, system 10 supports communication sessions among endpoints 24. A communication session communicates information via instant messages (IMs), electronic mail ("email") messages, voicemail messages, and/or audio and/or video signals. Information may refer to voice, data, text, audio, video, multimedia, control, signaling, and/or other information.

Endpoint 24 communicates with a communication system. Examples of endpoint 24 include a telephone such as a cellular telephone, a personal digital assistant, a computer such as a laptop, a mobile handset, or any other device operable to communicate with system 10. In the illustrated embodiment, endpoints 24 include a grantor endpoint 24a and a grantee endpoint 24b. Grantor endpoint 24a grants grantee endpoint 24b permission to access target 28, for example, unlock lock 32 of target 28. By granting the permission, grantor endpoint 24a agrees to allow grantee endpoint 24b to have a virtual key that is operable to unlock lock 32.

As an example, an automobile owner may grant a driver permission to use an automobile. The owner may use grantor endpoint 24a to send a virtual key to grantee endpoint 24b of the driver. The driver may then use the virtual key to access the car. As another example, a hotel may grant a hotel guest permission to access a room.

A virtual key may be a token (such as an encrypted file) that indicates the permission to access target 28. For example, a key may include a pass code and/or other information. The key may include attributes or a pointer to attributes that designate use of target 28, such as when, where, and/or how target 28 may be used. For example, an attribute may designate an area where an automobile may be driven.

The virtual key may be provided to grantee endpoint 24b in any suitable manner. As an example, grantor endpoint 24a may send the key to grantee endpoint 24b. As another example, grantor endpoint 24a may request that key server 25 send the key to grantee endpoint 24b. Grantee endpoint 24b may then send the key to target management system 20 in any suitable manner, such as through a wired or wireless link.

In certain cases, a breach of a restriction may occur. A breach occurs when a restriction given by an attribute restricting use of target 28 has been violated. For example, the user may drive an automobile outside of the area designated by an attribute. A designated endpoint 24 may be notified of the breach by, for example, an email, text, and/or voice message. Any suitable endpoint 24 may be the designated endpoint 24, such as the grantor endpoint 24a or another endpoint 24 designated by the grantor. Target management system 20 may notify the designated endpoint 24 directly, or may notify grantee endpoint 24b, which in turn notifies the designated endpoint 24.

The permission may be modified in response to the breach. Modifying the permission may involve adjusting the attributes to restrict the use of target 28 or revoking the permission to prohibit the use of target 28. The permission may be modified automatically in response to the breach, or may be modified after an instruction from the grantor. Target management system 20 or grantee endpoint 24b may make the modification.

Grantee endpoint 24b can store and transmit customization parameters to target management system 20 to customize features 36 of target 28. Customization parameters may include settings for particular features 36, for example, a setting for a seat height. Customization parameters may include information to be presented to the user of target 28, for example, directions to reach a destination.

Network 26 represents a communication network that allows endpoints 24 to communicate. A communication network may comprise all or a portion of one or more of the following: a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, and/or other suitable communication links.

Target 28 represents any suitable object (such as a physical object) or resource that may be locked to limit access and/or may have adjustable features. Examples of an object include a vehicle (such as a boat, an airplane, a motorcycle, or an automobile), a gate, a building (such as a house or office building), a room (such as a hotel room or office), a credit card, a servicing system (such as a vending machine or an automatic teller machine), or a safe. Examples of a resource include a monetary account, such as a checking, savings, trading, or credit account.

Lock 32 represents a physical lock that locks target 28 to prevent someone from accessing, entering, and/or using target 28. Examples of locks 32 include mechanical and/or electronic (magnetic or electric strike) locks. Features 36 are features of target 28 that can be adjusted. Features 36 may include, for example, climate control, lighting, ergonomic, media, safety, informational, navigational, and/or other features. Examples of climate control features include cooling and heating systems. Examples of lighting features include the on/off and brightness of a light. Examples of ergonomic features include seat, mirror, steering wheel, and window placement. Examples of media features include audio, video, or multimedia systems. Examples of safety features include security alarms, speeding alerts, and proximity sensors. Examples of informational features include telecommunication systems and user display systems. Examples of navigational features include global positioning systems and navigational mapping systems.

Target management system manages lock 32 and features 36 of target 28. Target management system 20 may unlock lock 32 in response to receiving a virtual key. Target management system 20 may customize features 36 in accordance with customization parameters.

System 10 may utilize communication protocols and technologies to support the communication sessions. Examples of communication protocols and technologies include those set by the Institute of Electrical and Electronics Engineers, Inc. (IEEE) 802.xx standards, the International Telecommunications Union (ITU-T) standards, the European Telecommunications Standards Institute (ETSI) standards, the Internet Engineering Task Force (IETF) standards, or other standards.

A component of system 10 may include any suitable arrangement of elements, for example, an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Certain logic, such as a processor, may manage the operation of a component. Examples of a processor include one or more computers, one or more microprocessors, one or more applications, and/or other logic.

A memory stores information. A memory may comprise computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Modifications, additions, or omissions may be made to system 10 without departing from the scope of the invention. The components of system 10 may be integrated or separated. Moreover, the operations of system 10 may be performed by more, fewer, or other components. Additionally, operations of system 10 may be performed using any suitable logic. As used in this document, "each" refers to each member of a set or each member of a subset of a set.

Figure 2:
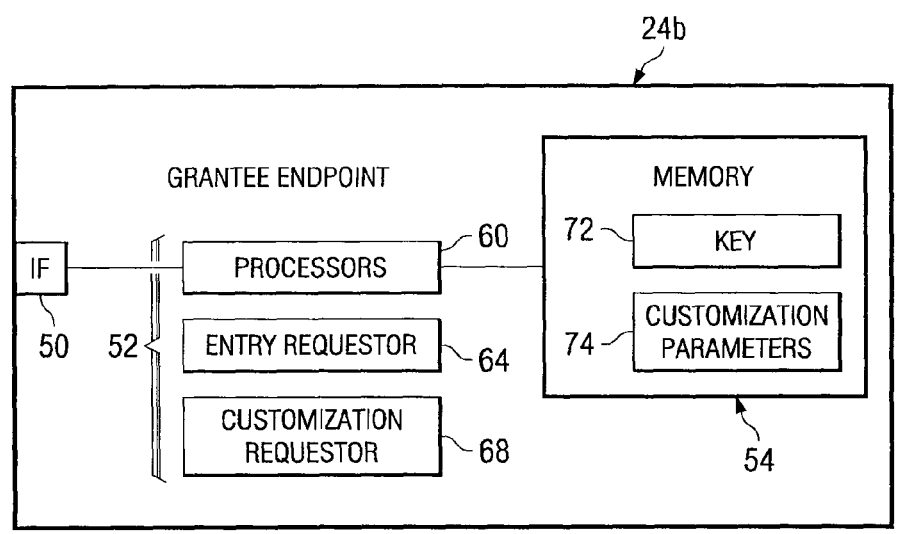
FIG. 2 illustrates an example endpoint that may be used with the system of FIG. 1.

FIG. 2 illustrates one embodiment of endpoint 24b that may be used with system 10 of FIG. 1. In the illustrated embodiment, endpoint 24b includes an interface 50, logic 52, and a memory 54 coupled as shown. Logic 52 includes one or more processors 60, an entry requester 64, and a customization requester 68. Memory 54 stores a virtual key 72 and customization parameters 74.

Entry requester 64 receives virtual key 72 from grantor endpoint 24a, and transmits key 72 to management system 20 of target 28 to unlock lock 32. In one embodiment, entry requestor 64 transmits key 72 only if certain security measures are met. For example, key 72 is transmitted only if grantee endpoint 24b is a predetermined distance (for example, less than one foot away) from a device associated with the user (for example, a watch).

In one embodiment, entry requester 64 receives a notification from target management system 20 that a breach has occurred. Entry requester 64 notifies the designated endpoint 24 of the breach, and modifies the permission to restrict or revoke the permission.

Customization requester 68 manages customization parameters 74 for customizing target 28. A customization parameter 74 indicates a setting for a feature 36 of target 28. Examples of climate control parameters include temperature settings for cooling and heating systems. Examples of lighting parameters include times when a light should be turned on or off. Examples of ergonomic parameters include settings for seat position and height. Examples of media parameters include preset radio channels. Examples of safety parameters include a maximum speed that triggers a speeding alert. Examples of informational parameters include a map to be displayed on a user display.

Customization requestor 68 obtains customization parameters 74 (such as obtains new parameters or obtains changes to existing parameters) in any suitable manner. For example, a user may enter the parameters directly into endpoint 24b. As another example, a user may enter a customization parameter 74 from another endpoint 24, such as a computer. The other endpoint 24 may then transmit the parameters to endpoint 24b. As another example, user may set a feature 36 of target 28, for example, adjust a seat height. Target management system 20 may then send these parameters to endpoint 24b.

Customization requester 68 inserts the customization parameters into a customization request and transmits the customization request to a customizer of target 28 to customize target 28. The customization request may be transmitted in an access request requesting access to the target or may be transmitted in a separate message.

In one embodiment, customization requester 68 receives a customization update from target management system 20. The update indicates that a customization parameter has been updated, for example, by the user adjusting a feature 36. Customization requestor 68 records the updated customization parameter.

Modifications, additions, or omissions may be made to endpoint 24b without departing from the scope of the invention. The components of endpoint 24b may be integrated or separated. Moreover, the operations of endpoint 24b may be performed by more, fewer, or other components. For example, the operations of requesters 64 and 68 may be performed by more than one component. Additionally, operations of endpoint 24b may be performed using any suitable logic.

Figure 3:
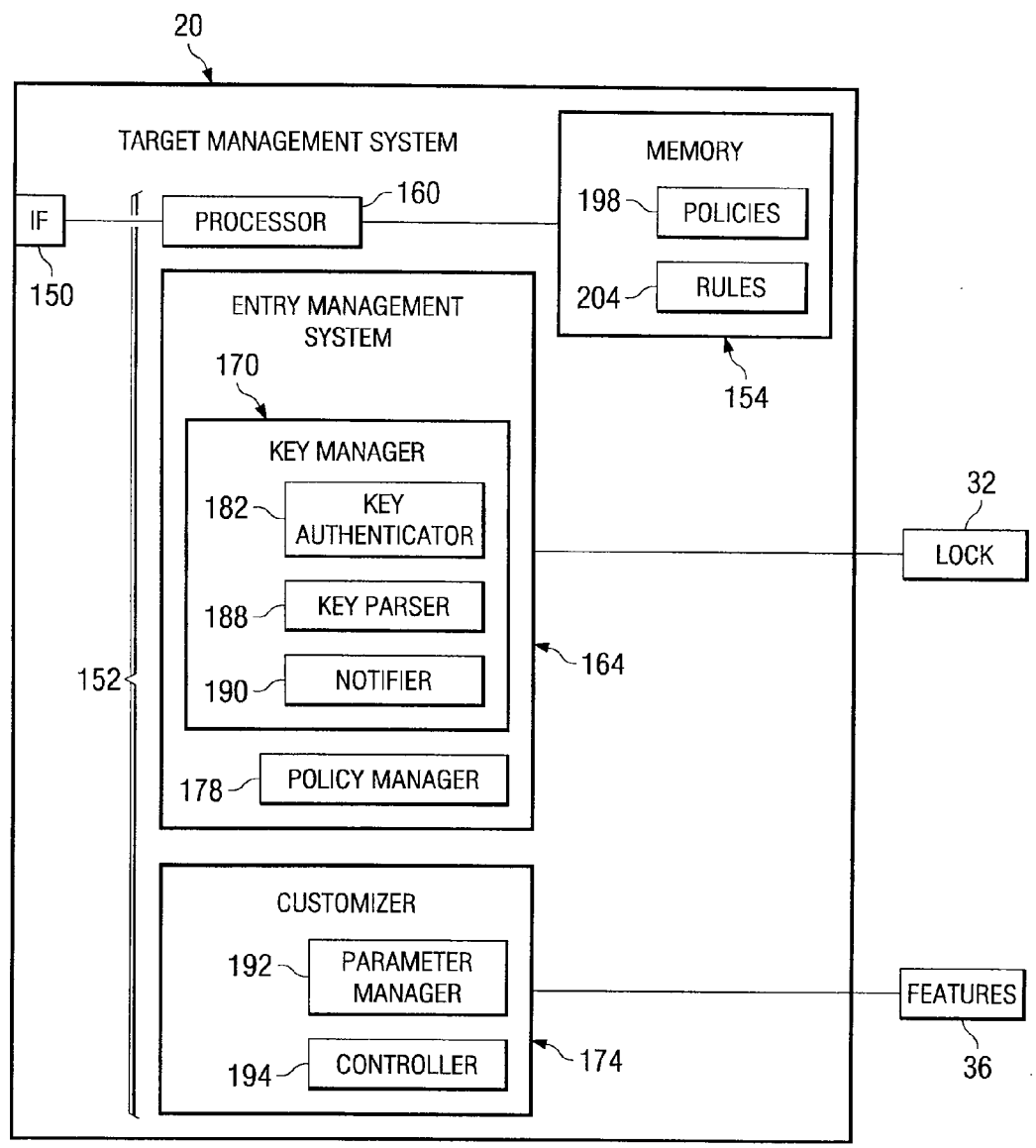
FIG. 3 illustrates an example target management system that may be used with the system of FIG. 1.

FIG. 3 illustrates one embodiment of target management system 20 that may be used with system 10 of FIG. 1. In the illustrated embodiment, target management system 20 includes an interface 150, logic 152, and a memory 154 coupled as shown. Logic 152 includes one or more processors 160, an entry management system 164, and a customizer 174. Entry management system 164 includes a key manager 170 and a policy manager 178. Key manager 170 includes a key authenticator 182, a key parser 188, and a notifier 190. Customizer 174 includes a parameter manager 192 and a feature controller 194. Memory 154 stores policies 198 and rules 204.

Entry management system 164 unlocks lock 32 in response to receiving and authenticating virtual key 72. Entry management system 164 may also detect a breach of a restriction and notify a designated endpoint 24 of the breach. Key authenticator 182 authenticates key 72 according to any suitable security measure. As an example, key authenticator 182 may require that the user of endpoint 24*b* enter a password along with key 72. Key parser 188 parses key 72 to extract information from key 72. Notifier 190 determines that a breach of a restriction has occurred and initiates notification of a designated endpoint 24.

Policy manager 178 manages policies 198 that include attributes designating use of the permission. An attribute may designate when, where, and/or how target 28 may or may not ("may/not") be used. A temporal attribute designates when target 28 may/not be used, for example, target 28 may/not be used during specified hours or for longer than a specified duration. A spatial attribute designates the area in which target 28 may/not be used, for example, target 28 may only be used in a specified geographical area. A use attribute designates how target 28 may/not be used. For example, a use attribute may designate the maximum speed of a vehicle, the maximum and/or minimum climate control temperatures of a vehicle or room, or the lighting schedule of a room.

An attribute may include a combination of temporal, spatial, and/or use attributes. For example, an attribute may designate a lower maximum speed for a vehicle at night and a higher maximum speed during the day. As another example, an attribute may designate a lower maximum air conditioning temperature setting during work hours and a higher setting during other hours.

Policy manager 178 may obtain the attributes in any suitable manner. For example, policy manager 178 may extract attributes from key 72. As another example, policy manager 178 may extract a pointer from key 72, and then may use the pointer to obtain the attributes.

Customizer 174 customizes features 36 in accordance with customization parameters 74. Parameter manager 192 establishes customization parameters 74 and sends parameters 74 to feature controller 194. Parameter manager 192 also detects if a parameter 74 has been updated, for example, a user may change the seat position of a vehicle. Parameter manager 192 then records the updated parameter 74.

Feature controller 194 adjusts features 36 in response to customization parameters 74. Feature controller 194 may adjust the features 36 in accordance with rules 204. A rule 204 specifies an adjustment of feature 36 to be made in accordance with a customization parameter 74. Feature controller 194 may also detect an adjustment of a feature 36 and may notify parameter manager 192 of the adjustment.

Modifications, additions, or omissions may be made to target management system 20 without departing from the scope of the invention. The components of target management system 20 may be integrated or separated. Moreover, the operations of target management system 20 may be performed by more, fewer, or other components. For example, the operations of key authenticator 182 and key parser 188 may be performed by one component, or the operations of customizer 174 may be performed by more than one component. Additionally, operations of target management system 20 may be performed using any suitable logic.

Figure 4:
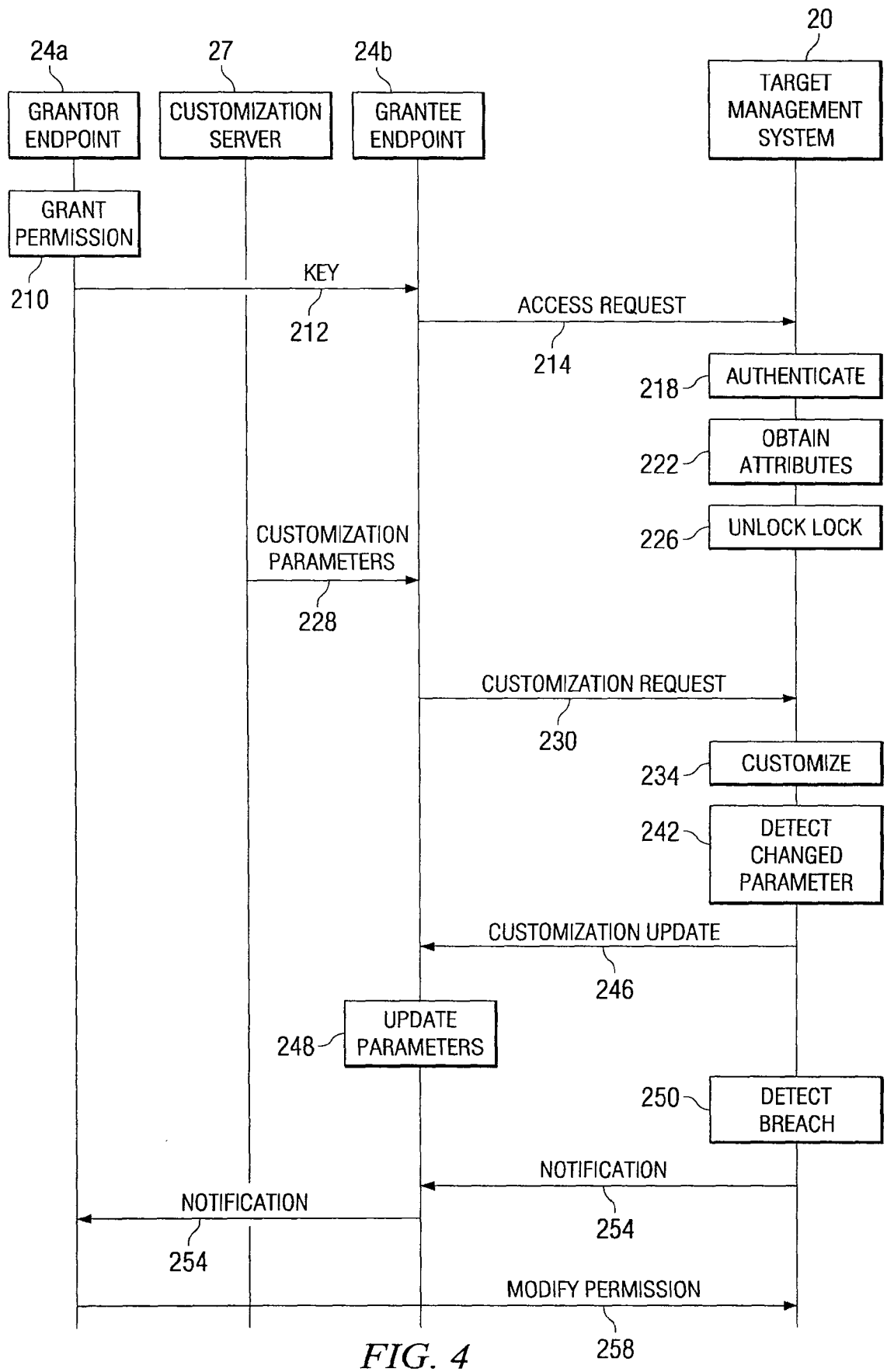
FIG. 4 illustrates an example method for accessing and customizing a target using an endpoint.

FIG. 4 illustrates one embodiment of a method for accessing and customizing target 28 using endpoint 24*b*. The method begins at step 210, where grantor endpoint 24*a* grants grantee endpoint 24*b* permission to access target 28. Grantor endpoint 24*a* allows grantee endpoint 24*b* to receive virtual key 72 at step 212. Grantor endpoint 24*a* may send key 72 to grantee endpoint 24*b*, or may request that key server 25 send key 72 to grantee endpoint 24*b*.

Grantee endpoint 24*b* sends an access request to target management system 20 of target 28 at step 214. The access request includes key 72. Key authenticator 182 authenticates key 72 at step 218. Policy manager 178 obtains attributes of the permission at step 222. Key 72 may include the attributes or may include a pointer that points to a policy 198 that includes the attributes. Entry management system 164 unlocks lock 32 at step 226.

Grantee endpoint 24*b* obtains customization parameters 74 at step 228. The user may enter the customization parameters 74 into grantee endpoint 24*b* or into another endpoint 24 that communicates parameters 74 to grantee endpoint 24*b*. Grantee endpoint 24*b* sends a customization request to customizer 174 of target management system 20 at step 230. Customization request includes customization parameters 74.

Customizer 174 customizes features 36 of target 28 at step 234. Parameter manager 192 establishes customization parameters 74 from the customization request and sends them to feature controller 194, which adjusts the features 36 in accordance with parameters 74.

Target management system 20 detects that a customization parameter 74 has been changed at step 242. For example, feature controller 194 detects that a feature 36 has been adjusted and notifies parameter manager 192 of the adjustment. Parameter manager 192 determines an updated customization parameter 74 indicating the adjustment, and sends a customization update with the updated customization parameter 74 to grantee endpoint 24*b* at step 246. Grantee endpoint 24*b* updates customization parameter 74 at step 248.

Entry management system 164 detects a policy breach at step 250. Notifier 190 notifies a designated endpoint 24 of the breach at step 254. In the illustrated embodiment, the designated endpoint is grantor endpoint 24*a*. The designated endpoint 24 is notified directly by notifier 190 or through grantee endpoint 24*b*. The permission may be modified by target management system 20 or endpoint 24*b* at step 258. The permission may be modified to restrict or revoke the permission, and may be automatically modified or in response to an instruction from the designated endpoint 24. After the modification, the method terminates.

Modifications, additions, or omissions may be made to the method without departing from the scope of the invention. The method may include more, fewer, or other steps. Additionally, steps may be performed in any suitable order.

Certain embodiments of the invention may provide one or more technical advantages. A technical advantage of one embodiment may be that a grantor endpoint grants a grantee endpoint permission to access a target, such as an automobile. The permission allows the grantee endpoint to obtain a virtual key. The grantee endpoint transmits the key to the target to unlock the target.

Another technical advantage of one embodiment may be that the virtual key includes or points to attributes that designate when, where, and/or how the target may be used. Another technical advantage of one embodiment may be that if a restriction given by an attribute is breached, a designated endpoint, such as the grantor endpoint, is notified of the breach. The permission may be modified in response to the notification to restrict or revoke use of the target.

The present disclosure encompasses all changes, substitutions, variations, alterations, and modifications to the example embodiments described herein that a person having ordinary skill in the art would comprehend. Similarly, where appropriate, the appended claims encompass all changes, substitutions, variations, alterations, and modifications to the example embodiments described herein that a person having ordinary skill in the art would comprehend.

What is claimed is:

1. A method comprising:
receiving a virtual key at a grantee endpoint, the virtual key resulting from a permission from a grantor endpoint, the virtual key received through a wireless link, the virtual key operable to unlock a lock of a vehicle, the lock comprising a physical lock;
storing one or more customization parameters, a customization parameter designating a setting for a feature of one or more features of the vehicle;
inserting the one or more customization parameters into a customization request;
sending the customization request to a customizer of the vehicle to customize the vehicle; and
wirelessly transmitting the virtual key to a management system of the vehicle to unlock the lock only if a set of security measures defined by the grantor via an attribute has been satisfied, wherein the virtual key indicates the attribute, the attribute designating limitations on the usage of the vehicle including when the vehicle may be used after the lock is unlocked, where the vehicle may be used after the lock is unlocked, or how the vehicle may be used after the lock is unlocked;
establishing that a breach of the attribute has occurred;
notifying the grantee endpoint that the breach of the attribute has occurred, wherein the grantee endpoint notifies the grantor endpoint that the breach of the attribute has occurred in response to being notified that the breach has occurred; and
modifying the permission in response to the breach, wherein modifying the permission in response to the breach comprises at least one of:
modifying an area where the vehicle may be operated;
modifying a time when the vehicle may be operated;
modifying a duration of time when the vehicle may be operated; and
modifying a maximum speed at which the vehicle may be operated.

2. The method of claim 1, the set of security measures comprising:
a security measure requiring the grantee endpoint be located within a predefined distance of the lock.

3. The method of claim 1, further comprising:
receiving an instruction to modify the permission; and
modifying the permission in response to the instruction.

4. The method of claim 1, the setting designated by a user of the vehicle.

5. The method of claim 1, further comprising the steps:
determining that a customization parameter has been updated in response to an adjusted feature; and
recording the updated customization parameter.

6. The method of claim 1, further comprising the steps:
notifying a designated endpoint of the breach;
receiving an instruction to modify the permission;
modifying the permission in response to the instruction;
determining that a customization parameter has been updated in response to an adjusted feature, the setting designated by a user of the vehicle; and
recording the updated customization parameter, the set of security measures comprising a security measure requiring the grantee endpoint be located within a predefined distance of the lock.

7. An apparatus comprising:
a memory operable to:
store a virtual key at a grantee endpoint, the virtual key resulting from a permission from a grantor endpoint, the virtual key received through a wireless link, the virtual key operable to unlock a lock of a vehicle, the lock comprising a physical lock;
store one or more customization parameters, a customization parameter designating a setting for a feature of one or more features of the vehicle;
a customization requestor coupled to the memory and operable to:
insert the one or more customization parameters into a customization request; and
send the customization request to a customizer of the vehicle to customize the vehicle; and
an entry requestor coupled to the memory and operable to:
wirelessly transmit the virtual key to a management system of the vehicle to unlock the lock, the entry requestor wirelessly transmitting the virtual key only if a set of security measures defined by the grantor via an attribute has been satisfied, wherein the virtual key indicates the attribute, the attribute designating limitations on the usage of the vehicle including when the vehicle may be used after the lock is unlocked, where the vehicle may be used after the lock is unlocked, or how the vehicle may be used after the lock is unlocked;
establish that a breach of the attribute has occurred;
notify the grantee endpoint that the breath of the attribute has occurred, wherein the grantee endpoint notifies the grantor endpoint that the breach of the attribute has occurred in response to being notified that the breach has occurred; and
modify the permission in response to the breach, wherein modifying the permission in response to the breach comprises at least one of:
modifying an area where the vehicle may be operated;
modifying a time when the vehicle may be operated;
modifying a duration of time when the vehicle may be operated; and
modifying a maximum speed at which the vehicle may be operated.

8. The apparatus of claim 7, the set of security measures comprising:
a security measure requiring the apparatus be located within a predefined distance of the lock.

9. The apparatus of claim 7, the entry requestor further operable to:
receive an instruction to modify the permission; and
modify the permission in response to the instruction.

10. The apparatus of claim 7, the setting designated by a user of the vehicle.

11. The apparatus of claim 7, the customization requestor further operable to:
determine that a customization parameter has been updated in response to an adjusted feature; and
record the updated customization parameter.

12. The apparatus of claim 7:
the set of security measures comprising a security measure requiring the apparatus be located within a predefined distance of the lock;
the entry requestor further operable to
receive an instruction to modify the permission and to modify the permission in response to the instruction;
the setting designated by a user of the vehicle; and
the customization requester further operable to:
determine that a customization parameter has been updated in response to an adjusted feature; and
record the updated customization parameter.

13. A system comprising:
means for receiving a virtual key at a grantee endpoint, the virtual key resulting from a permission from a grantor endpoint, the virtual key received through a wireless link, the virtual key operable to unlock a lock of a vehicle, the lock comprising a physical lock;
means for storing one or more customization parameters, a customization parameter designating a setting for a feature of one or more features of the vehicle;
means for inserting the one or more customization parameters into a customization request;
means for sending the customization request to a customizer of the vehicle to customize the vehicle; and
means for wirelessly transmitting the virtual key to a management system of the vehicle to unlock the lock only if a set of security measures defined by the grantor via an attribute has been satisfied, wherein the virtual key indicates the attribute, the attribute designating limitations on the usage of the vehicle including when the vehicle may be used after the lock is unlocked, where the vehicle may be used after the lock is unlocked, or how the vehicle may be used after the lock is unlocked;
means for establishing that a breach of the attribute has occurred;
means for notify the grantee endpoint that the breach of the attribute has occurred, wherein the grantee endpoint notifies the grantor endpoint that the breach of the attribute has occurred in response to being notified that the breach has occurred; and
means for modifying the permission in response to the breach, wherein modifying the permission in response to the breach comprises at least one of:
modifying an area where a vehicle may be operated;
modifying a time when the vehicle may be operated;
modifying a duration of time when the vehicle may be operated; and
modifying a maximum speed at which the vehicle may be operated.

14. The method of claim 1, wherein the one or more customization parameters indicates a setting for a feature of the vehicle.

15. The method of claim 1, further comprising:
receiving a customization update; and
recording an updated customization parameter in response to receiving the customization update.

16. The apparatus of claim 7, wherein the one or more customization parameters indicates a setting for a feature of the vehicle.

17. The apparatus of claim 7, wherein the customization requestor is further operable to:
receive a customization update; and
record an updated customization parameter in response to receiving the customization update.

* * * * *